E. E. COOK.
SIX WHEEL PIVOTAL BOGIE TRUCK.
APPLICATION FILED MAR. 31, 1920.
1,352,878.
Patented Sept. 14, 1920.
2 SHEETS—SHEET 2.
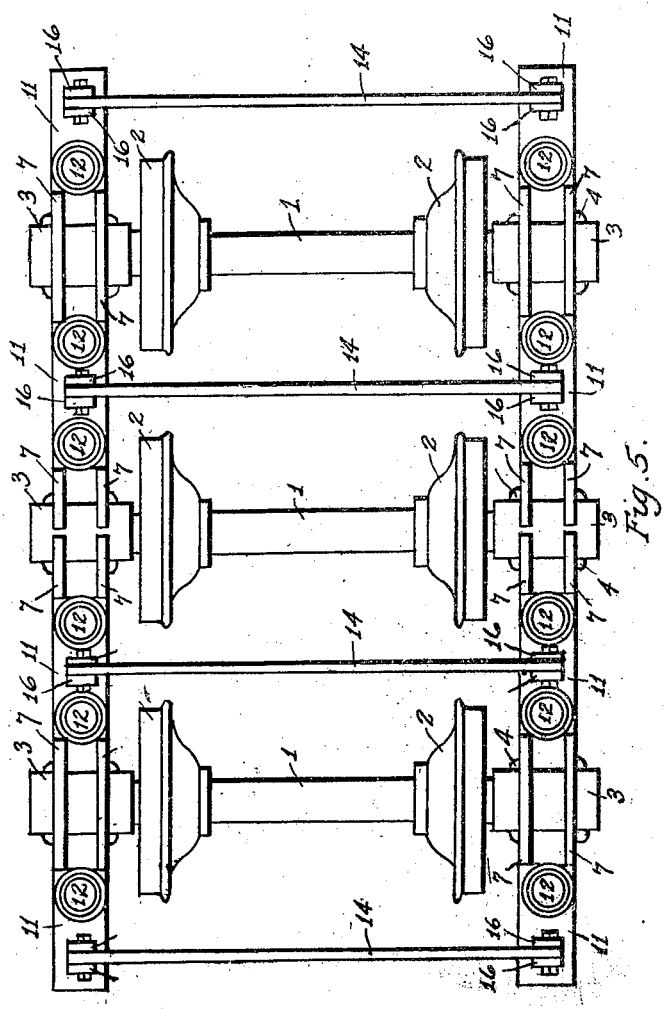
INVENTOR
Elmer E. Cook

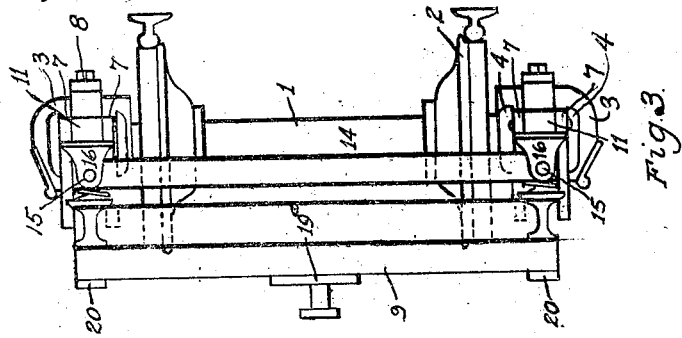

UNITED STATES PATENT OFFICE.

ELMER E. COOK, OF SHARON HILL, PENNSYLVANIA, ASSIGNOR OF ONE-HALF TO DOUGLAS THORTON, OF PHILADELPHIA, PENNSYLVANIA.

SIX-WHEEL PIVOTAL BOGIE-TRUCK.

1,352,878.

Specification of Letters Patent.

Patented Sept. 14, 1920.

Application filed March 31, 1920. Serial No. 370,147.

*To all whom it may concern:*

Be it known that I, ELMER E. COOK, citizen of the United States, residing at Sharon Hill, county of Delaware, Pennsylvania, have made certain new and useful Improvements in Six-Wheel Pivotal Bogie-Trucks, of which the following is a specification.

My invention relates to improvements in the design and construction of six wheel bogie car trucks, and especially to that class of six wheel trucks which are adapted for use on freight cars wherein extra heavy loads are carried.

The primary object of my present invention is to produce a truck which will make possible a considerable increase of capacity in the car unit, as the larger the unit the more economy in transportation. One of the agencies employed in my present construction, whereby this result is achieved to a marked extent, is what I term an "improved" method of load distribution.

It has been usual heretofore to distribute an equal portion of the load to each of the six wheels in this type of truck by means of a double or twin set of transoms and bolsters connected together by a bridge, one end of which is fastened to each of the bolsters and on which bridge the center plate is placed an equal distance from each bolster. The transoms which are connected to the side frames of the truck, and which carry the bolsters and spring planks through the medium of swinging links must, in order to distribute the load, be equally placed nearer to the wheels and axles in each end of the truck, and farther from the pair of center wheels and axle. This uneven spacing of the transoms requires the wheel base of the truck to be increased proportionately, which results in reducing the truck's ability to safely negotiate the short radius curves usually met with at mining and industrial sidings. For this reason mainly six wheel trucks do not figure greatly in freight transport. Another objection to this usual form of construction is the height from the rails to center plate, which raises the center of gravity of the car.

According to my "improved" construction, the bolsters and spring plank and links are dispensed with—the transoms are retained and fastened, as usual, to the main side frames, but are centrally placed be- base of the truck is greatly reduced, and the height of the center plate from the rail lowered, thus naturally making a six wheel truck more practical for heavy freight service.

The distribution of the load in my improved method is effected by changing the location of the main body springs from the spring plank to the sides of the truck, placing them outside of wheels and an equal distance from the center of each journal supporting them on a lower equalizing frame, which frame rests on the journal boxes, and placing the main or top frame of the truck directly on the springs—the lower frame being double and provided with suitable spring seats to receive the springs, while the side members of the upper or main frame is provided with suitable spring caps to receive the tops of the springs.

The lowering of the center of gravity of the gross load, with my improved construction is accomplished by lowering the bridge usually connecting the bolsters, which permits lowering of the center plate to the amount of the height of said bridge. While my construction employs a bridge between transoms, it is on a level with the transoms.

Another valuable feature of my construction is the broadening of the span or spring base making the base from center to center of journals transversely of the truck, whereas the usual base is from end to end of spring plank between the wheels. By materially increasing the span of the spring-support of the load, enables it to resist transverse oscillation to a greater extent than under the old method of swinging bolster or spring-plank support. Sufficient clearance is allowed between side frame and top of journal box for spring action.

My invention also includes a flexible lower frame for the truck, which permits a certain amount of free action laterally, which assists the truck in negotiating curves and adjusting itself to any variations in track alinement, but the especial feature of this lower frame—outside of the above and its duty of carrying the springs and load—is its vertical articulation, which permits the wheels at crossings, or low rail joints, to move in and out of the depressions without straining beyond the elastic limit any members of the trucks. While this lower frame commonly used, yet they should not be confused, as their functions are mainly different. This lower frame might be joined together, or hinged over the central journal box, instead of parted, as shown on the drawings, without impairing its functions. The cross-bars, or tie-bars, on this lower frame or frames are, of course, intended to support the brakes, as well as tie the frame together.

And further, the general construction and combination of parts hereinafter described, are further pointed out in the claims.

In the drawings, Figure 1 is a side elevation of a truck embodying my improvements. Fig. 2 is a plan view of Fig. 1. Fig. 3 is an end elevation of the truck. Fig. 4 shows construction of main side frame. Fig. 5 shows clearer the construction of lower side frame. Similar numerals of reference indicate corresponding parts throughout the several views. 1 in drawings are the axles and 2 the truck wheels; 3 the journal boxes provided with vertical restraining ribs 4.

The truck-frame is of the class known as "axle-box" frame—that is, it is usually supported by and maintains the axle-boxes in parallelism—said frame comprising, as to both sides of the truck, the top chord 5 of side frames having inverted U-shaped yokes or pedestals 6 embracing the axle boxes between the bars of lower frame 7 which are between ribs 4, the yokes being preferably an integral part of the side bar or top chord. The lower portion of the yokes are bolted to the tie-bar 8, the tie-bar constituting a lower chord for the side frame. The ends of the side frame extend outwardly and are connected to a cross bar or end sill 9.

The foregoing comprises the truck-frame, which may be variously termed an "axle box frame" or "truck-frame," and the top chord may be termed the "side bar" and the top chord extensions and yokes the "side frame." Resting directly on the journal boxes is lower frame 7 consisting of two bars running parallel and fastened together by rivets 10; spacing these two bars apart are castings 11 suitably recessed on the top for seating the truck springs 12; on the top of the springs are spring caps 13, which preferably are integral with the top chord—the same as the yokes—or may be separate; near each end of the lower frame which, although separated in the center, I consider as one frame—also between the axles and running transversely across the truck are tie-bars or brake support bars 14 secured to lower frame 6 by pin or bolt 15 through lugs 16, which are cast integral with spring castings 11. These lugs have space enough to permit of bars 14 articulating vertically. At 17 are transoms of angle iron, which extend between the top chords 5 of the side frames, the inner sides of the chords being provided with bracket-like lugs 18, or projections to which the ends of the transoms are secured, which lugs can be either bolted on or preferably cast integral with top chord.

The two transoms are joined together by bridge 19, also constructed of angle iron, and joined by means of lugs or angles 21 riveted to them. On top of bridge 19 is the center plate 19$^a$ upon which rests the car-body and is the center of pivotal action of the truck 20 having the usual side bearings.

In employing the words "transom" and "bridge," I do not intend to limit myself to a construction, as illustrated, as it is apparent that it is not essential to any of the improvements herein described that I should do so, and many other forms might be used; for instance—such as casting transoms and bridge together in one integral whole.

Having described my invention, I claim:

1. The combination in a six wheel car-truck and its running-gear of the main truck springs supported outside of the wheel-gage on an equalizing frame, resting directly on the journal boxes of the truck, substantially, as described.

2. The combination in a six wheel truck and its running-gear of a vertically articulated frame on which the main body springs rest, said frame resting directly on the journal boxes, substantially, as described.

3. The combination in a six wheel truck and its running-gear of a frame having the main load supporting springs resting on it having articulated tie-bars for supporting the brakes, substantially, as described.

4. The combination in a six wheel truck and its running gear of a top frame, transoms and bridge connecting said transoms, having no bolster, spring plank, or links, the side frames embracing the journal boxes supported on springs, resting on a lower frame resting directly on the journal boxes, substantially, as described.

ELMER E. COOK.